United States Patent [19]

Ootani et al.

[11] 4,154,686
[45] May 15, 1979

[54] APPARATUS FOR CONTINUOUS LIQUID-SOLID SEPARATION

[75] Inventors: Toshihiro Ootani, Osaka; Mikio Kozuka; Ryuichiro Takeda, both of Yokohama; Hideaki Kurihara, Kawasaki, all of Japan

[73] Assignees: Asahi Glass Company Ltd., Tokyo; Nakashima Manufacturing Co., Ltd., Osaka, both of Japan

[21] Appl. No.: 837,222

[22] Filed: Sep. 27, 1977

[30] Foreign Application Priority Data

Oct. 28, 1976 [JP] Japan ................................ 51/128803

[51] Int. Cl.² .......................................... B01D 35/08
[52] U.S. Cl. .................................. 210/328; 210/330; 210/401; 210/DIG. 3; 198/833; 226/173
[58] Field of Search ............... 210/328, 330, 401, 400, 210/DIG. 3; 226/173; 198/833

[56] References Cited

U.S. PATENT DOCUMENTS

| | | | |
|---|---|---|---|
| 1,472,902 | 11/1923 | Bulkeley | 226/173 |
| 1,876,399 | 9/1932 | Catala et al. | 210/401 |
| 2,688,406 | 9/1954 | Holland | 210/328 |
| 2,873,028 | 2/1959 | Bried | 210/401 |
| 3,006,479 | 10/1961 | Wallny | 210/401 |
| 3,105,817 | 10/1963 | Seibert | 210/401 |
| 3,513,974 | 5/1970 | Markwick | 210/328 |
| 3,703,963 | 11/1972 | Eguchi et al. | 210/401 |
| 3,796,317 | 3/1974 | Lippert et al. | 210/401 |
| 4,072,260 | 2/1978 | Dove | 226/173 |
| 4,072,611 | 2/1978 | Davis | 210/400 |

FOREIGN PATENT DOCUMENTS

| | | | |
|---|---|---|---|
| 256162 | 2/1962 | Australia | 210/328 |
| 911129 | 5/1954 | Fed. Rep. of Germany | 210/328 |
| 40-25035 | 5/1965 | Japan | 210/328 |
| 46-61728 | 8/1971 | Japan. | |

*Primary Examiner*—Benoit Castel
*Attorney, Agent, or Firm*—Oblon, Fisher, Spivak, McClelland & Maier

[57] ABSTRACT

An apparatus for continuous liquid-solid separation has suction boxes which respectively have a suction hole on a rear surface and a perforated surface at a front surface and said suction boxes being connected in series to form a conveyor and said suction holes being connected to a suction trough so as to give the sucking condition of the suction boxes in the zone of the suction trough wherein a filter cloth is contacted with the perforated surfaces of the suction boxes and is held by side plates which can be closed and opened at both sides of the suction boxes and the filter cloth and the suction boxes are moved at the synchronized velocity under suction.

6 Claims, 7 Drawing Figures

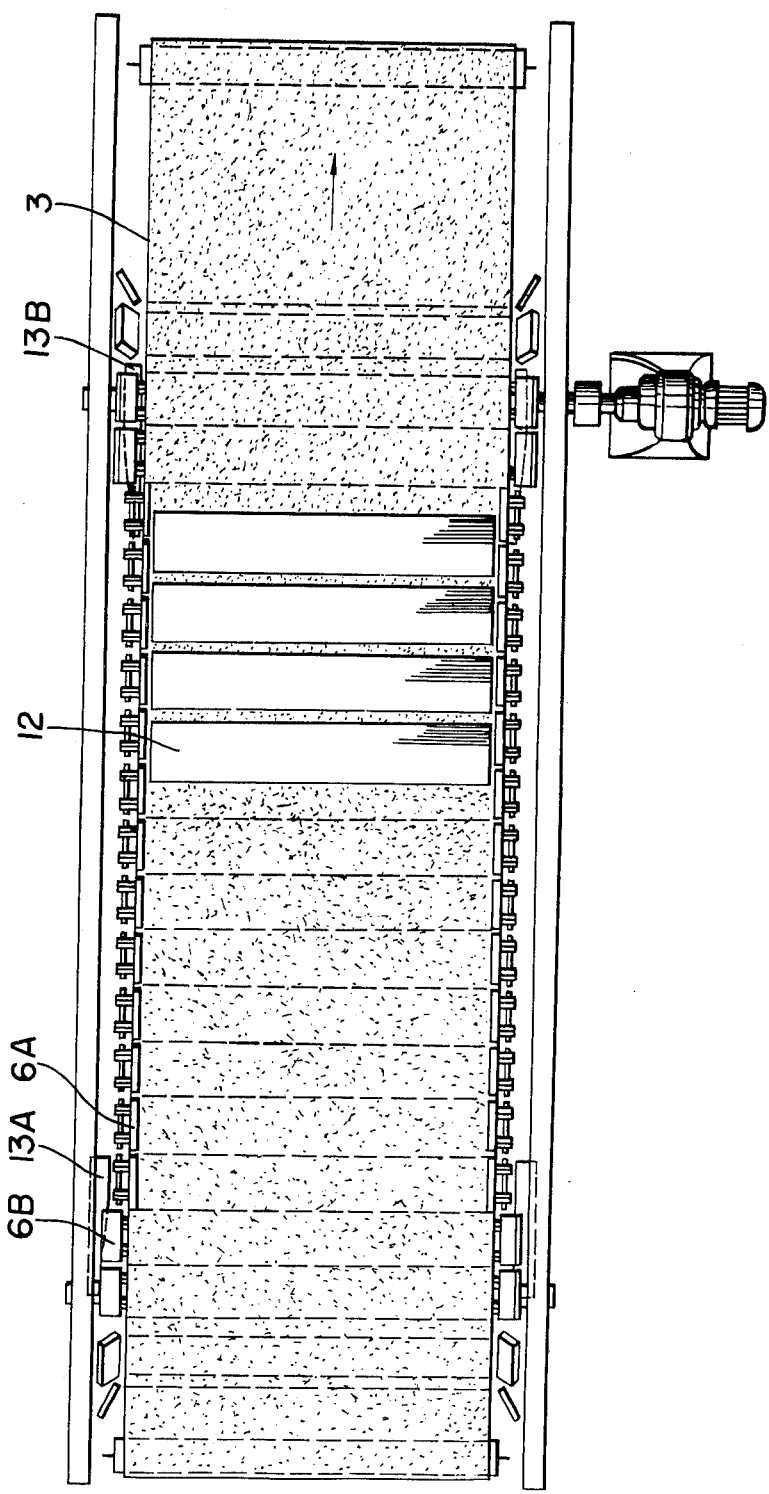

APPARATUS FOR CONTINUOUS LIQUID-SOLID SEPARATION

BACKGROUND OF THE INVENTION

1. Field of the Invention

The present invention relates to an apparatus for continuous liquid-solid separation of a slurry.

2. Description of the Prior Arts

Various apparatuses for solid-liquid separation of a slurry have been proposed. The apparatus for continuous solid-liquid separation which is equipped with suction boxes in a conveyor form, has high efficiency.

It has been known to use an apparatus which has many suction boxes each having a suction hole on the rear surface and a perforated surface such as a wire net at the front surface in a conveyor form, connecting the suction boxes in series, and which has a suction trough connected to the suction holes formed on the rear surfaces of the suction box so as to attain the desired sucking operation, because continuous mass-production can be attained by using the apparatus. The apparatus has been disclosed in French Pat. No. 981,497 and Japanese Patent Publications No. 8591/1957 and 846/1960 and Japanese Unexamined Patent Publication No. 91065/1975.

However, these conventional apparatuses have the following disadvantages. The suction boxes are connected in series whereby seams are formed on the solid product separated from the joints of the suction boxes and along sheet solid product is not easily obtained, and the separation of fine particles is difficult. When the filter cloth is directly connected to the suction boxes for separating the fine particles, damage and clogging of the filter cloth are caused, and a scraping step is employed for separating the solid product from the filter cloth. Accordingly, these apparatuses could be used only for limited applications.

A sheet of a fiber reinforced cement (hereinafter referring to as FRC) can be prepared by the apparatus.

SUMMARY OF THE INVENTION

It is an object of the present invention to provide an improved apparatus for continuous solid-liquid separation which can easily separate fine particles.

The forgoing and other objects of the present invention can be attained by providing an apparatus for continuous solid-liquid separation which comprises suction boxes wich respectively have a suction hole on the rear surface and perforated surface at a front surface of the suction box and said suction boxes being connected in series to form a conveyor and said suction holes being connected to a suction trough so as to provide a sucking condition of the suction boxes in the zone of the suction trough wherein a filter cloth is contacted with the perforated surfaces of the suction boxes and is held by side plates which can be closed and opened at both sides of the suction boxes and the filter cloth and the suction boxes are moved at the synchronized velocity under suction.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is a plan view of the apparatus according to the present invention; and

DETAILED DESCRIPTION OF THE PREFERRED EMBODIMENT

Figure 1:
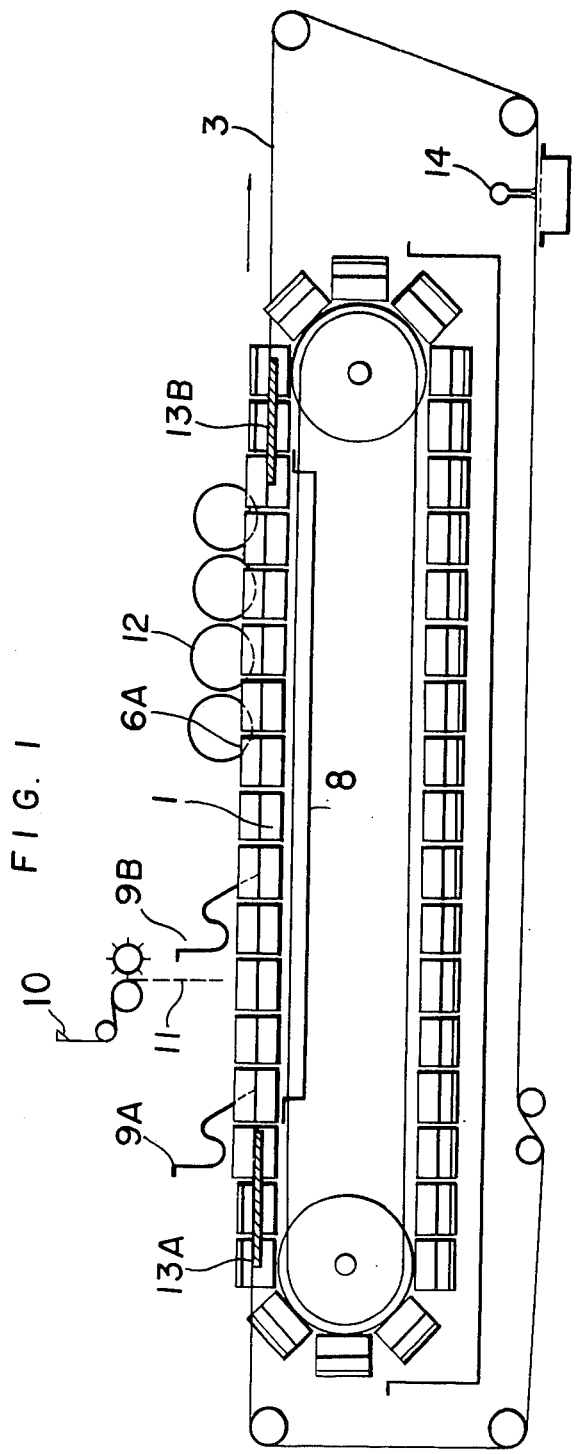
FIG. 1 is a schematic front view of the apparatus according to the present invention.

The advantageous feature of the present invention is that the apparatus can be used for continuous solid-liquid separation and also can be easily used for various applications for solid-liquid separations by exchanging the filter cloth.

The other advantageous feature of the present invention is than an endless filter cloth is used whereby the seams for the joints of the suction boxes are not substantially formed on the surface of the solid product to obtain a long plain sheet of the solid product. When the apparatus is used for preparing a sheet of FRC, the uneven parts caused by the wire net of the suction boxes or the joints of the suction boxes are not substantially formed and a long sheet of FRC having smooth surface can be obtained.

The other advantageous feature of the present invention is that both sides of the filter cloth held by the side plates in the movement of the filter cloth whereby creasing or twisting of the filter cloth is not caused by the movement along a long path and the air leakage at non-contacted part of the solid product due to the crease or twist is not caused and the shortage of the suction or the direct contact of the slurry to the suction boxes are not caused.

Moreover, in accordance with the present invention, the suction can be attained at only the desired zone because the suction is performed through the suction trough. It is possible to attain intermittent sucking. The hose for directly connecting the suction boxes to a vacuum pump is not necessary. Accordingly, the apparatus can be a large size that is to have more than 100 of the suction boxes and to have longer than 10 m of length apparatus. Accordingly, the applications of the apparatus of the present invention are broad and the maintenance of the apparatus is easy from the viewpoint of the structure.

In accordance with the present invention, the solid product is easily separated and the scraping step is not needed and the productivity is high because the filter cloth is used.

Moreover, in the apparatus of the present invention, the side plates have the function of the side walls so as to easily obtain a sheet of the solid product having a desired width and thickness. The side plates can be opened and closed whereby the damage and the deformation of the parts of the solid product contacted with the side plates are not substantially caused when the solid product is separated.

Furthermore, the apparatus of the present invention has the side plates, whereby a large amount of the slurry can be treated. That is, a large amount of a slurry from which the precipitate is easily formed, can be treated. Accordingly, it is also possible to use the apparatus for purification of lake water, which has been considered to be difficult.

The apparatus for continuous solid-liquid separation according to the present invention can be used for various solid-liquid separating processes such as a process for preparing viscose as the raw material of rayon and cellophane etc., and a process for preparing matrix compositions such as a fiber reinforced cement sheet, a slate and a wall plate etc., and a process for removing mud from a muddy lake water and a process for separating chemicals from a slurry. Since the side plates are used, the apparatus is especially suitable for treating a large amount of slurry.

When the apparatus is used for the continuous production of the fiber reinforcement cement, the continuous operations can be attained though it was difficult in the conventional apparatus.

The fiber reinforced cement has strength higher than that of the conventional Hatcheck method and similar to that of the direct spray method.

The apparatus of the present invention could be used for the solid-liquid separation, and the kind of the filter cloth, the reduced pressure, the length and number of the suction trough, and the velocity of the suction boxes can be selected depending upon the size of the solid particles, the concentration and the viscosity of the slurry.

Referring to the drawings, the apparatus of the present invention will be described.

FIG. 1 is a schematic front view of an apparatus for continuous solid-liquid separation of the present invention which is an apparatus for continuously preparing a glass fiber reinforced cement (herein referring to as GRC).

Suction boxes (1) having a perforated surface and a suction hole at a rear surface (or a side surface other than the perforated surface) are connected to form a conveyor. A suction trough (8) is formed in suitable zone at the rear side. A filter cloth (3) is contacted on the suction boxes in a suitable zone, and the side plates (6A) are closed by the guide rail (13A) whereby the filter cloth is held by the side plates (6A) and is moved at the synchronized velocity.

Figure 2:
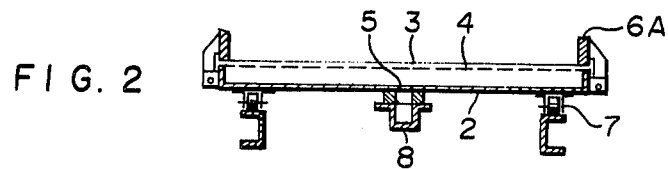
FIGS. 2 and 3 are respectively sectional views of the suction box in the apparatus according to the present invention.

The suction box has the sectional view in FIG. 2 wherein a perforated plate (4) having a perforated surface such as a wire net or punched metal having fine holes, is formed on the front surface and the suction hole (5) is formed on the rear surface and the sideplates (6A) which can be closed and opened for holding the filter cloth, are formed on the side surfaces.

Roller chains (7) for smoothly moving the suction box are connected if necessary. The suction trough (8) can be connected to the suction hole (5) so as to dewater by suction. The reference numeral (2) is a bottom plate.

Figure 3:
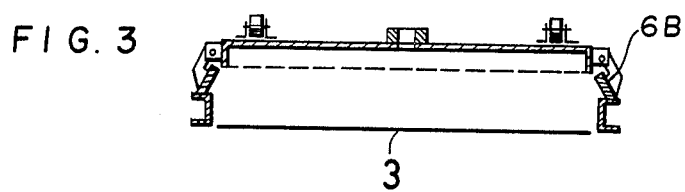

FIG. 3 shows the condition that where the filter cloth is separated from the suction box of FIG. 2 and the side plates (6B) are opened.

The suction boxes are connected in series and the filter cloth is closely contacted and a slurry is fed on the filter cloth. the apparatus for continuously preparing GRC, a cementitious slurry prepared by admixing a cement, a sand, an aggregate and an additive or a mixture of a fiber and the cementitious slurry is fed on the filter cloth by the slurry feeder (9A) and a chopped strand (11) prepared by cutting glass fiber roving (10) is fed on it and then cementitious slurry is fed on it by the other slurry is feeder (9B). Various manners for feeding the slurry can be considered and suitable manner can be selected.

In the case of the apparatus for continuously preparing GRC it is preferable to form multiplied layers having three or more layers as the apparatus of FIG. 1. It is especially preferably to form the surface layer having no or little content of the glass fiber in the dase of preparation of a sheet of GRC from the viewpoint of the surface character of GRC.

The solid-liquid separation is performed by dewatering under suction. That is, in the case of GRC, excess water if evacuated. If necessary, the product is dewatered under compressing with a press-roller (12) so as to form a smooth surface and the suction is released and thhe side plates are opened by the guide rail (13B) and the filter cloth is separated from the suction boxes. Then the geeen sheet of GRC is separated from the filter cloth and is set by suitable method.

The filter cloth is returned to the solid-liquid separation step if necessary, after washing it in a water wasing device (14). The filter cloth can be endless as well as non-endless would on a roller which can be used by one way feeding.

The suction trough can be a suitable type which acts to maintain the suction boxes under sucking. In FIG. 1, only one suction trough is used, however, plural suction troughs in series can be used. At the part for separating the filter cloth from the suction box, it is suitable to equip it with a compressed air trough.

It is preferable to equip a plurality of press-rollers which are arranged so as to impart lower pressure at upper stream and higher pressure at down stream from the viewpoints of a surface character and a strength of the separated solid product such as the green sheet of GRC.

FIG. 4 is a plan view of the apparatus of FIG. 1 wherein the filter cloth (3) is disposed on the suction boxes and the open side plates (6B) are closed by the guide rail (13A) to hold the filter cloth and the slurry is fed and is sucked and compressed by the press-rollers (12) and then the side plates are opened by the guide rail (13B) whereby the filter ccloth is separated from the suction boxes.

Figure 5:
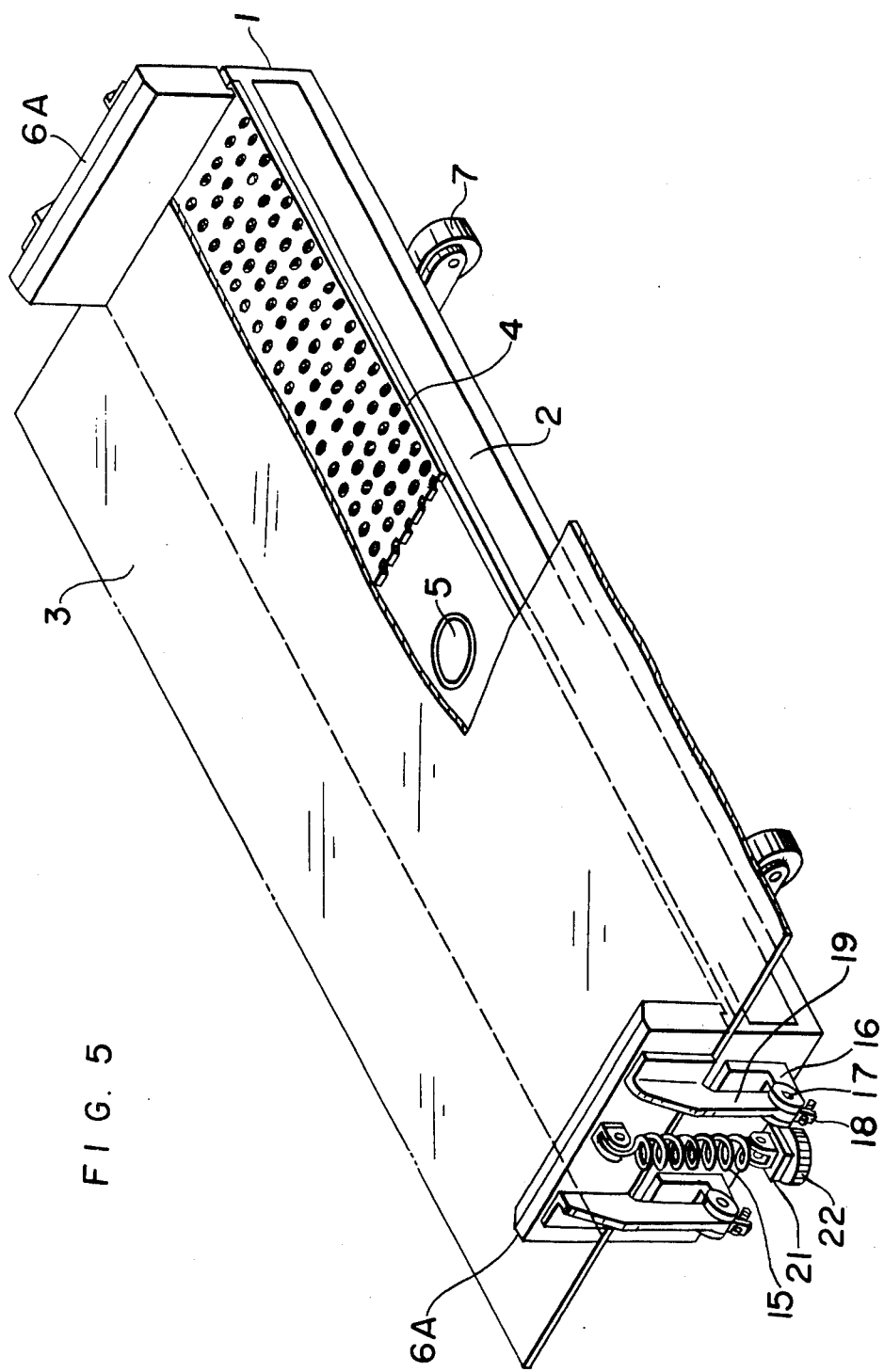

FIG. 5 shows one embodiment of an open-closed device for side plates equipped with the suction box (1). The side plate (6A) is connected to a roller (22) being shiftable to a transverse direction of the suction box and a spring (15), and the side plate is mounted on a bracket (19) which is pivotted to a bracket (16) on the side surface of the suction box with a pin (17). In the turn of the bracket (16) and the bracket (19), one is limited by the contact of the lower surface of the side plate with the upper surface of the suction box, and the other is limited by a stopper (18). The roller (22) is connected to a lever (21) which slides on the lower surface of the suction box.

Figure 6:
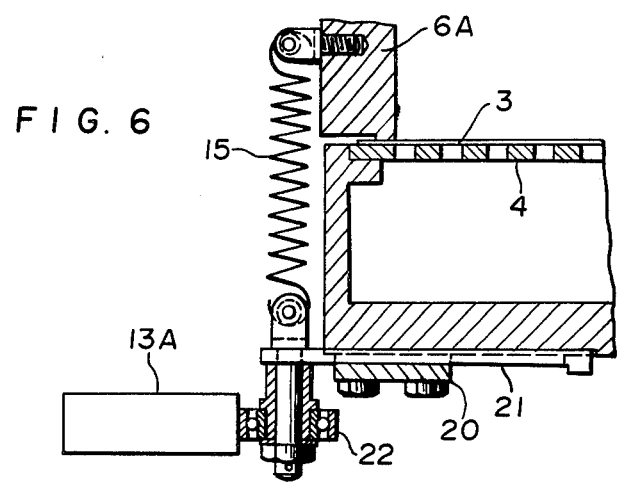
FIGS. 5 to 7 are respectively schematic views of the open-close device for the side plate in the apparatus according to the present invention.
Figure 7:
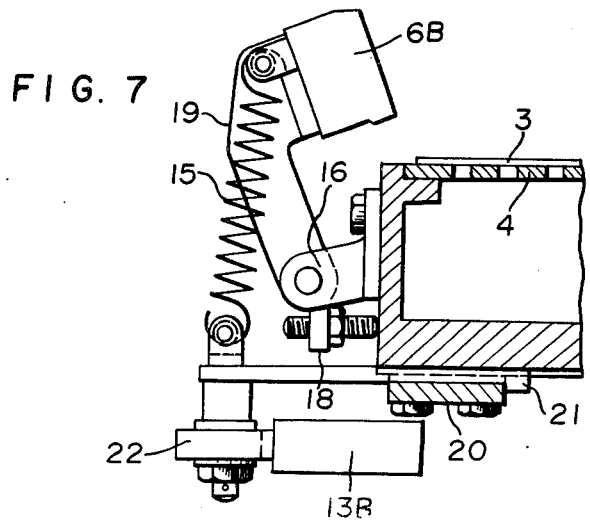

FIGS. 6 annd 7 are sectional views for illustrating the movements of the side plate of the suction box FIG. 5. In FIG. 6, the side plate is also shown by a sectional view and the side plate is closed. In FIG. 7, the side plate is not a sectional view and only the part of the suction box is shown by a sectional view as a partially sectional view and the side plate is opened.

The guide rail (13A) pushes the roller (22) to the side of the suction box, whereby the lever (21) is slid into the suction box and the side plate (6A) is closed so as to hold the filter cloth (3) between the side plate and the suction box by a spring (15).

The lever (21) is slidably connected on the lower surface of the suction box by a slide metal part (20) etc.

After the suction, the roller (22) is pushed out by the guide rail (13B) and the lever (21) is slid outwardly and the side plate (6B) is pulled out by the spring (15) to be opened.

In this case, the opening position is decided by the position of the stopper (18).

The filter cloth is contacted and held on the suction boxes by the side plates and the filter cloth and the suction boxes are moved at synchronizing velocity whereby any crease or twist is not formed on the filter cloth and an adverse effect is not caused for the solid-liquid separation.

The side plate opening device shown in FIGS. 5 to 7 is only one embodiment. Various open-close devices having the structures for holding the filter cloth by the side plates can be used.

In accordance with the present invention, various solid-liquid separations can be easily attained with high efficiency.

The apparatus can be used for various applications by exchanging the filter cloth. The crease or wave of the filter cloth is not caused and the solid-liquid separation is not adversely affected and the large size of the apparatus can be used for various solid-liqiid separations which will be needed in the further.

What is claimed as new and desired to be secured by Letters Patent of the United States is:

1. An apparatus for producing a uniform continuous sheet by continuous liquid-solid separation comprising:
   an array of suction boxes;
   means joining said array into a conveyor having at least one run;
   means for moving said conveyor along said run;
   a suction hole located on a rear surface of each said suction box;
   a perforated surface forming at least part of a front surface of each said suction box;
   a suction trough communicating with each suction hole along said run for sucking liquid from the suction boxes;
   a filter cloth synchronously movable with said conveyor adjacent said perforated surfaces along said run only;
   side plates forming substantially continuous opposite side wall surfaces for said suction boxes, transverse to the direction of said run, movable to a closed position along said run to hold a portion of said filter cloth, and movable to an open position at the ends of said run to release said filter cloth;
   means for opening and closing said side plates;
   whereby a liquid-solid slurry fed to the filter cloth surface at the beginning of the run will be dewatered by the sucking effect of the suction trough to form a continuous uniform sheet on the filter cloth at the end of said run.

2. An apparatus for continuous liquid-solid separation according to claim 1 which further comprises a least one press-roller for compressing said slurry on said filter cloth into a solid product.

3. An apparatus for continuous liquid-solid separation according to claim 2 wherein a plurality of the press-rollers are used, said press-rollers arranged to provide higher pressure at the down stream end of said plurality and lower pressure at the up stream end of said plurality.

4. An apparatus for continuous liquid-solid separation according to claim 1 including means for providing a cementitious slurry on the filter cloth, means for providing a glass fiber on the slurry and means for providing a cementitious slurry on said glass fiber so as to form a multi-plied green sheet.

5. An apparatus according to claim 1 wherein the run is entirely within a single plane and the means for opening and closing the side plates are located immediately adjacent the ends of said run so that the filter cloth may continue to travel to the plane of said run following said suction run so as to not rupture said sheet.

6. An apparatus for producing uniform continuous sheets by continuous liquid-solid separation comprising:
   an array of suction boxes;
   means joining said array into a conveyor having at least one run;
   means for moving said conveyor along said run;
   a suction hole located on a rear surface of each of said suction box;
   a perforated surface forming at last part of a front surface of each said suction box;
   a suction trough communicating with each suction hole along said run for sucking liquid from the suction boxes;
   a filter cloth synchroniously movable with said conveyor adjacent said perforated surfaces along said run only;
   side plates forming opposite side surfaces for said suction boxes, transverse to the direction of said run, movable to a closed position along said run to hold a portion of said filter cloth, and movable to an open position at the end of said run to release said filter cloth;
   means for opening and closing said plates, said means for opening and closing said plates being repsectively pivotably connected to the sides of said suction boxes;
   guide rails mounted out of said suction boxes and adapted to contact said means for opening and closing said side plates to turn said side plates;
   whereby a liquid-solid slurry fed to the filter cloth surface at the beginning of the run will be dewatered by the sucking effect of the suction trough to form a continuous uniform sheet on the filter cloth at the end of said run.

* * * * *